Patented Oct. 5, 1937

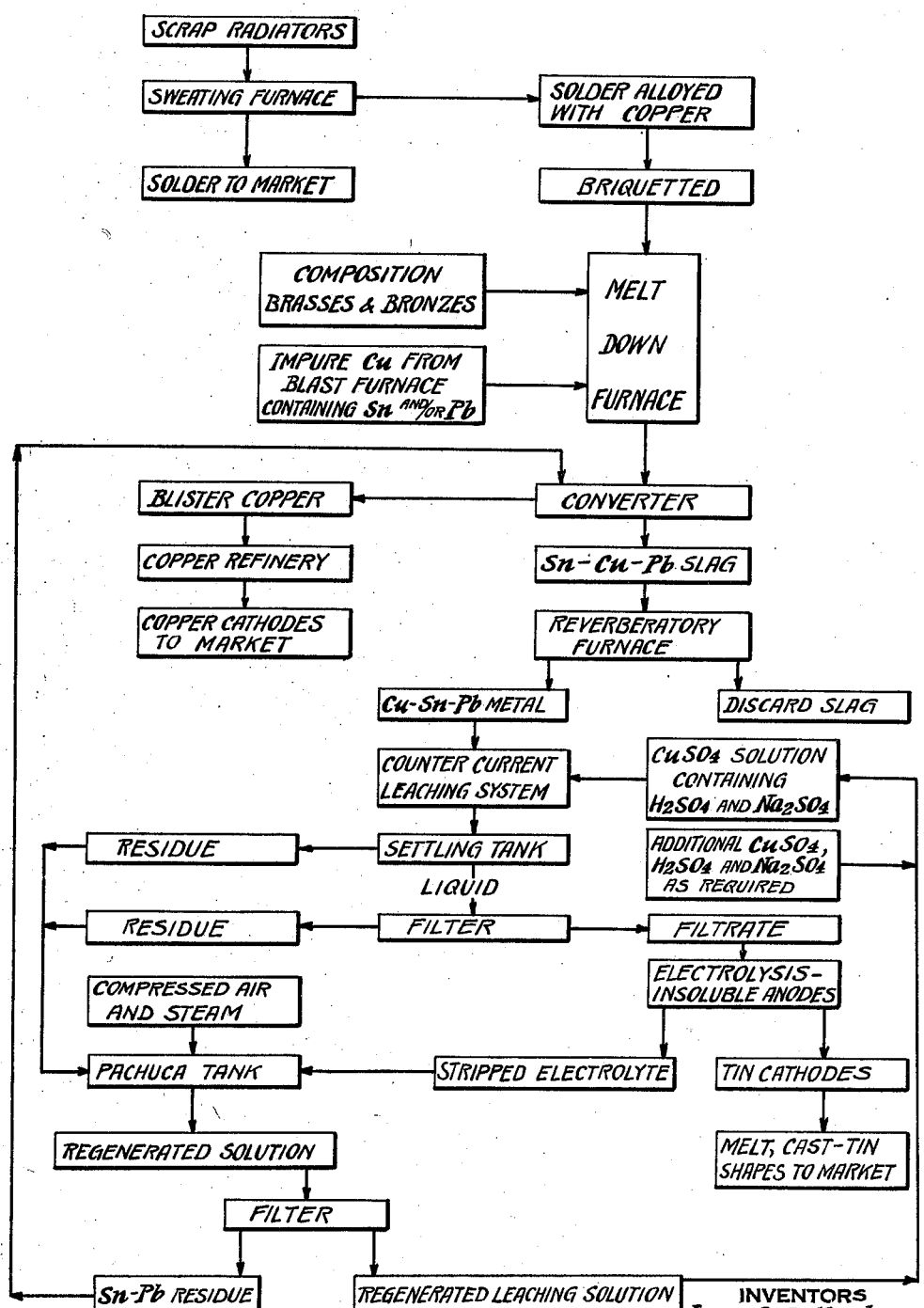

2,094,632

UNITED STATES PATENT OFFICE 2,094,632

METALLURGICAL PROCESS

Jesse O. Betterton, Metuchen, and George K. Baumann, Port Reading, N. J., assignors to American Smelting and Refining Company, New York, N. Y., a corporation of New Jersey Application December 3, 1934, Serial No. 755,726

6 Claims. (Cl. 204—57)

The present invention provides an improved process for the treatment of metalliferous materials, such as metallurgical by-products, scrap, ores, and the like wherein the materials, in suitable condition, are subjected to a leaching solution of such composition as will dissolve the values, which are then recovered from the solution in a direct and economical manner.

More specifically, the invention provides a hydro-metallurgical process for the recovery of tin, which process may be applied to a wide variety of tin-bearing materials, including by-products from scrap treatment, tin ores, including low grade ores, and, in general, any stanniferous material in which the tin is present in a form convertible to metal, the present process then being applicable for the refining and recovery of the tin in a condition of very high purity.

One of the objects of the present invention is to provide a process wherein the tin-bearing material is efficiently extracted by a suitable solvent, from which the tin may be recovered in an exceptionally high state of purity, and in an economical manner.

A further object of the invention is to provide a leaching process for the extraction of tin from tin-bearing materials from which the tin may be economically extracted in a high state of purity, and in which the leach liquid may be easily and efficiently regenerated.

Further objects and advantages of the invention will become apparent as the description proceeds, the features of novelty being pointed out in the appended claims.

Before proceeding with a specific illustration of the present improved process, it is thought to be desirable to review, generally, the various steps of the procedure.

Although applicable to tin-bearing materials generally, wherein the tin is present in metallic state, the present process is designed especially for the recovery of tin in a high degree of purity from by-products resulting from the treatment of scrap materials, such as, for example, scrap combustion engine radiators; and the process will be described as applied to the recovery of tin from the sources just indicated above, although it is to be borne in mind that the process is of widely general adaptation to materials containing tin in metallic form.

In accordance with the practice of the process as applied to scrap radiators and the like, the scrap is first subjected to a sweating operation in suitable furnaces, whereby a certain amount of the solder associated with the scrap is melted off and collected in a directly marketable condition.

A certain amount of the solder becomes alloyed with the copper of the radiators and to recover this alloyed solder the radiators, after being sweated, are briquetted and then sent on to a melt down furnace, for melting. The supply of material in the melt down furnace may be augmented by the addition of scrap composition brasses and bronzes and also with impure copper from the blast furnace, this copper containing considerable tin and/or lead and other impurities.

The alloyed materials from the melting furnace are then sent to a converter and blown with air under a suitable flux comprising, for example, soda ash, sand and fluorspar, although other fluxing materials may be employed. The converter is rotated and the charge is blown with air to eliminate the zinc as fume. The blowing also oxidizes a part of the tin and copper present, together with the lead, the resulting oxides being transferred into the flux to form a slag or dross. This slag or dross is separated from the remainder of the charge in the converter, which remaining charge is blister copper which is sent to the refinery for the refining into electrolytic copper. The slag or dross separated from the blister copper of the converter is sent to a reverberatory furnace or it is smelted to metal with coke, and a discard slag is formed.

The metal thus produced forms a valuable by-product because of its high tin and copper contents, and it is readily treated by the present improved process for recovering high-grade tin therefrom.

In order to refine this by-product, it is first reduced to metallic form by smelting with coke. A typical analysis of the reduced metal is:

Sn 42%  =840 lbs. Sn/ton
Cu 43.4 %=878 lbs. Cu/ton
Pb  9.0 %=180 lbs. Pb/ton
Fe  0.9 %= 18 lbs. Fe/ton
Sb  0.8 %= 16 lbs. Sb/ton
Zn  0.36%=7.2 lbs. Zn/ton
Ni  0.12%=2.4 lbs. Ni/ton In accordance with the present process, this metal, ground to a suitable fineness is leached with an acid sulphate solution, a solution of copper sulphate being found to leach the material with a very high degree of efficiency. Sulphuric acid is desirably added to the leach liquor, and may itself be used as the leach material, but the presence of copper sulphate produces a wholly unexpected leaching efficiency, the copper sulphate resulting in a leaching efficiency of 90% or better, which is at least double that obtainable by sulphuric acid alone. It has been observed, however, that the tin extracted from the metal tends to hydrolyze in the leach solution, but it has been found that the hydrolysis of the tin is prevented by the addition of suitable quantities of non-hydrolyzing soluble sulphates, for example, sodium sulphate or potassium sulphate, which are accordingly desirably present in the leaching solution.

The leaching is desirably carried out by heating materials during the leaching operation, the temperature and time of leach being controlled so as to prevent substantial hydrolysis of the resulting tin solution, tests having shown that while sodium sulphate and other soluble sulphates prevent hydrolysis of the tin solution up to a certain point, excessive heating or excessively prolonged contact of the metal with the leaching solution will hydrolyze the tin, notwithstanding the presence of the sulphate. Tests on this point have shown that sodium sulphate definitely prevents hydrolysis of the tin if the solution thereof is not heated above approximately 70° C. and if the time of leaching does not exceed approximately one hour. Too high temperatures and/or too long a leaching time produce hydrolysis of the tin notwithstanding the presence of the sodium sulphate thereby causing excessive tin losses and rendering filtration difficult.

In order to effect a thorough contact between the leaching solution and the metal, it has been found in practice to be desirable to introduce the metal and the leaching solution into a pebble mill containing flint pebbles as in this way a most intimate contact is effected by the grinding action imparted by operation of the mill. Certain distinct advantages are obtained by the use of a pebble mill over the use of a ball mill for this purpose, for the steel balls of a ball mill become coated with lead sulphate, and there is also an inevitable solvent action on the balls by the leaching solution. This solvent action of the leaching solution on the iron of the balls precipitates out the copper from the copper sulphate leaching solution before the tin in the metal being treated has a chance to act, and in view of the fact that the efficiency of the leaching action of the copper sulphate on the tin is dependent largely on the interchange between tin and copper, the precipitation of the copper by the iron of the balls would largely destroy the effectiveness of the copper sulphate as a tin leaching material. Both of the above-mentioned objections are obviated by the use of the pebbles. It is found in practice that a 90% extraction of the tin, or better, is obtained, actually, in a leaching time of from twenty minutes to half an hour.

The leaching itself may be effected in any suitable manner, as in leaching tanks using the counter-current principle, or in a revolving drum, also using the counter-current principle, the leaching solution being passed in a direction counter to the direction of travel of the material so that there will be an excess of sulphate solution at one end of the leaching apparatus and excess of metal at the other end. During the leaching, tin passes into solution from the metal being leached, displacing an equivalent amount of copper from the solution:

$$Sn + CuSO_4 \rightarrow SnSO_4 + Cu$$

From the leaching system, the solution and solids are passed to a settling tank, where an initial clarification of the solution is effected, the clarification being completed by filter pressing.

The clarified solution, containing the extracted tin in solution, is sent on to electrolytic cells, the solution being electrolyzed using desirably, insoluble anodes (graphite or lead) and cathodes of sheet tin. A suitable addition agent may be used in the electrolyte for obtaining a good deposit of tin, as, for example, glue and cresylic acid in substantially equal proportions.

The tin cathodes with their resulting deposit of tin are melted and cast into bars for marketing. The tin thus produced is of exceptionally high quality.

The stripped electrolyte is open to several possible treatments:

(1) The entire amount of the stripped electrolyte may be mixed with the enriched copper-bearing residue from the leaching operation, thereby regenerating the leaching solution by solution of the copper, the regeneration being effected desirably in a Pachuca tank with the aid of compressed air and steam which render the copper readily soluble in the stripped sulphate electrolyte, now consisting essentially of sulphuric acid.

(2) If impurities, such as iron for example, have built up in the electrolyte to such an extent as to depress unduly the deposition of the tin, the stripped electrolyte may be divided and a portion thereof sent to the Pachuca tank, the remainder being treated with hydrogen sulphide to precipitate the tin as sulphide, which may be filtered off, roasted to oxide and smelted down to metal, the liquid from the sulphide precipitation being discarded.

(3) A third mode of treatment would be, under the conditions of (2) above, to precipitate the entire volume of stripped electrolyte with hydrogen sulphide, with subsequent treatment of the precipitated SnS as indicated under (2) above, and discarding the liquid. In this event, fresh leaching solution would be regenerated in the Pachuca tank by the addition of sulphuric acid thereto in quantities sufficient to dissolve the copper.

Of course the step of electrodeposition of the tin could be entirely replaced, if desired, by the sulphide precipitation above outlined, or by any other way of recovering tin from the sulphate solution; but experience indicates that such substitution can be made only at the sacrifice of efficiency and economy, it being found in practice that the electrolysis of the tin-bearing solution is the most direct and economical method, and producing tin of the highest degree of purity.

The material from the Pachuca tank is filtered, the residue being suitably smelted to produce a metal suitable for releaching by the process as above indicated, while the regenerated leaching liquid is returned for re-use, with the addition of sulphuric acid and/or sodium sulphate as may be required.

It will thus be seen that the process is fully cyclic, and in actual practice it operates easily and with a high efficiency throughout the various steps.

Instead of sending the entire residue from the leaching operation to the Pachuca tank, a part of such residue may be sent directly to the smelter for remaking starting metal.

The accompanying drawing illustrates a flow sheet of one form of the process, which flow sheet will be described in connection with a specific example of the process, which example will be understood as being purely illustrative of the process and in no sense limiting thereof, and since the preparation of the metal to be treated forms no part of the present invention except in general combination with the steps of the novel procedure, the detailed description of the procedure illustrated by the flow sheet will be begun with the treatment of the metal itself.

In accordance with the illustration shown in the drawing, one ton of metal, to be refined and ground to a suitable fineness is leached with 400 cubic feet or 11,300 liters of leaching liquor. The metal may have the typical composition previously indicated herein, i. e.:

Sn 42%=840 lbs./ton
Cu 43.2%=878 lbs./ton
Pb 9.0%=180 lbs./ton
Fe 0.9%=18 lbs./ton
Sb 0.8%=16 lbs./ton
Zn 0.36%=7.2 lbs./ton
Ni 0.12%=2.4 lbs./ton The leaching liquor may have the typical composition: $H_2SO_4$ 105 gms./liter=2609 pounds in the 11,300 liters used; $Na_2SO_4$ (to prevent hydrolysis of the dissolved tin) 101 gms./liter=2510 pounds; Cu as $CuSO_4$ 20.2 gms./liter=505 pounds; Sn as $SnSO_4$ 10 gms./liter=249 pounds. This tin, of course, is not present in the fresh leaching solution, but represents accumulated residual tin resulting from recycling the solution, the presence of which is accounted for by not obtaining an absolutely complete precipitation of the tin in the electrolytic cells. The quantity of the leaching solution and its composition are largely dependent upon the composition of the metal being refined.

The leaching liquor and metal to be refined are brought together in an agitator or revolving drum. Practice has shown that the highest efficiency of the leaching is obtained by using a revolving drum or pebble mill using flint pebbles, the leaching being performed on the countercurrent principle, as above indicated, and the mixture being heated to approximately 70° C. to expedite the solvent action. If the leaching is performed in agitating tanks, practice indicates that a very fine grinding of the metal should be resorted to, —300 mesh being necessary for greatest leaching efficiency. If the leaching is performed in a revolving drum or pebble mill, the grinding need not be carried so far. At approximately 70° C., a leaching time of about one hour is found to be sufficient. During the leaching operation, the tin from the metal being treated goes into solution, precipitating equivalent amounts of copper.

From the leaching system, the materials pass to a settling tank where an initial clarification of the solution is effected. The liquid usually remains turbid, however, so that a filter press is usually connected with the settling tank, so that the solution can be run immediately through the filter press.

This procedure separates the materials into a solid residue and a filtrate. The residue analyzes, typically, Pb 180 pounds as $PbSO_4$ (85 pounds $H_2SO_4$); Cu 1345 pounds metallic; Fe 5.5 pounds; Ni 0.6 pounds; Sn 84 pounds representing unleached tin. The residue also retains some solubles, for instance about 1%, accounting for 10 pounds of Sn; 34 pounds of $H_2SO_4$, and 25 pounds of $Na_2SO_4$.

The filtrate and wash water usually run about 400 cubic feet, being composed of approximately:

Sn 995 pounds=40 gms./liter
$H_2SO_4$ 2490 pounds=100 gms./liter
$Na_2SO_4$ 2490 pounds=100 gms./liter
Fe 249 pounds=10 gms./liter
Ni 40 pounds=1.6 gms./liter This filtrate is passed to electrolytic cells, where it is electrolyzed, using preferably insoluble anodes of graphite or lead, for example, and cathodes of sheet tin. Typical electrolysis data may be indicated as follows:

Cell voltage=2.1 volts
Current consumption=317 K. W. H. at room temperature, or 917 K. W. H. per ton
Ampere efficiency=93.7%

The electrolysis is carried out preferably in the presence of a suitable addition agent, such as glue and cresol in equal amounts of 7 pounds for the indicated quantity of electrolyte.

The tin deposits on the cathodes under the above conditions in a good deposit of very high purity. Under the above conditions, the weight of the tin deposit was found to be 634 pounds. The tin is melted in a suitable melting pot and cast into bars for sale or other desired disposition.

The stripped electrolyte contains approximately 3200 pounds of $H_2SO_4$, or 129 gms./liter. This stripped electrolyte is mixed with the residue in a Pachuca tank, where the metallic copper of the residue is dissolved by the stripped electrolyte with the aid of compressed air and steam introduced into the Pachuca tank from a suitable source.

The resulting solution and residue from the Pachuca tank is passed through a filter press, where the regenerated leaching solution and the residue are separated.

The residue is returned to the converter for re-treatment and re-conversion into metal for retreatment.

The solution, amounting to approximately 400 cubic feet, including water condensed from the steam of the Pachuca tank, contains approximately: $H_2SO_4$ 2262 pounds; $Na_2SO_4$ 2365 pounds; Cu 505 pounds; Sn 249 pounds. This tin is residual tin, undeposited in the electrolytic cells.

In order to make up the desired concentration of leaching solution for re-use, and to replace the materials lost from the cycle by the regular discarding of part of the electrolyte, there were added approximately 347 pounds—$H_2SO_4$ equivalent to 450 pounds of 60° Bé. acid and 150 pounds of $Na_2SO_4$, the resulting solution being then re-used.

As indicated above, if impurities such as iron build up in the electrolyte to an extent adversely effecting the deposition of the tin, the remaining tin may be precipitated with hydrogen sulphide, which, in the acid solution present, will not throw down impurities such as iron or nickel. The precipitated stannous sulphide is roasted to oxide and then smelted to metallic tin. The residue from the Pachuca tank is also smelted to form a metal suitable for refining in accordance with the process.

The present process is adapted to a wide variety of applications for the refining of tin, many tin-bearing materials being capable of being treated by this process, individual steps of which may be modified, of course, as may be determined by particular operation conditions. Low grade tin ores may be treated for the recovery of the tin by subjecting them to a reducing roast to produce metallic tin and then leaching the reduced roast with copper sulphate in a revolving drum.

The process may be adapted for the treatment of materials other than tin-containing materials, as any metallic material electropositive to copper may be rendered amenable to treatment in accordance with this general process and from the above description, it will become apparent that many details of operation may be modified to meet particular conditions of operation without departing from the inventive concept; it will be understood accordingly that it is intended and desired to embrace within the scope of this invention such modifications and changes as may be necessary to adapt it to varying conditions and uses.

What is claimed is:

1. A process of recovering the values from scrap combustion engine radiators and the like which comprises melting scrap radiator material, transferring the resulting molten alloy material to a converter, blowing the said material to blister copper with attendant formation of a slag rich in tin and copper, with smaller quantities of lead, separating the said slag from the blister copper, and smelting the said slag to produce an alloy metal rich in tin and copper, leaching the said metal with copper sulphate solution to dissolve the tin, and recovering the tin from the resulting tin-containing solution.

2. A process of recovering the values from scrap combustion engine radiators which comprises melting scrap radiator material, transferring the resulting molten alloy material to a converter, blowing the said material to blister copper with attendant formation of a slag rich in tin and copper with smaller quantities of lead, separating the said slag to produce an alloy metal rich in tin and copper, leaching the said metal with copper sulphate solution in the presence of sufficient sodium sulphate to prevent hydrolysis of the tin dissolved by the copper sulphate, and recovering the tin from the resulting tin-containing solution.

3. A process of recovering the values from scrap combustion engine radiators which comprises melting scrap radiator material, transferring the resulting molten alloy material to a converter, blowing the said material to blister copper with attendant formation of a slag rich in tin and copper with smaller quantities of lead, separating the said slag to produce a brittle alloy metal rich in tin and copper, leaching the said metal with copper sulphate solution in the presence of sufficient sodium sulphate to prevent hydrolysis of the tin dissolved by the copper sulphate, recovering the tin from the resulting tin-containing solution, and regenerating the copper sulphate solution for leaching further quantities of the said metals.

4. A process of recovering tin from impure copper-tin alloys containing not less than approximately 40% of tin which comprises leaching the alloy with copper sulphate solution to dissolve the tin with resultant precipitation of copper in the presence of sufficient sodium sulphate to prevent hydrolysis of the tin dissolved by the copper sulphate, recovering the tin from the resulting tin-containing solution, redissolving the precipitated copper in the resulting tin-stripped solution, thereby regenerating copper sulphate, and leaching further quantities of the alloy with the regenerated solution.

5. A process of recovering tin from impure copper-tin alloys containing not less than approximately 40% of tin which comprises dissolving the tin with copper sulphate solution containing sufficient sodium sulphate to prevent hydrolysis of the tin dissolved by the copper sulphate, the solution of the tin being accompanied by precipitation of equivalent amounts of copper from the copper sulphate, recovering the tin from the resulting tin-containing solution, and contacting the resulting stripped solution with the precipitated copper under conditions effecting solution of the copper with consequent regeneration of the said copper sulphate solution adapted to dissolve fresh quantities of tin from the said alloys.

6. A process of recovering the values from scrap combustion engine radiators and the like which comprises melting scrap radiator material, transferring the resulting molten alloy material to a converter, blowing the said material to blister copper with attendant formation of a slag rich in tin and copper with smaller quantities of lead, separating the said slag from the blister copper, smelting the said slag to produce an alloy metal rich in tin and copper, leaching the said metal with copper sulphate solution to dissolve the tin with attendant precipitation of copper, electrolyzing the resulting tin solution under conditions effecting dense, adherent deposits of tin, and contacting the resulting stripped electrolyte with the precipitated copper under conditions effecting solution thereof to regenerate the said copper sulphate solution.

JESSE O. BETTERTON.
GEORGE K. BAUMANN.